United States Patent [19]

Simpson et al.

[11] Patent Number: 4,761,556
[45] Date of Patent: Aug. 2, 1988

[54] ON BOARD RECEIVER

[75] Inventors: Fynlon G. Simpson, Grand Prairie; Robert L. Fisher, Arlington; James Kissell, Watauga, all of Tex.

[73] Assignee: LTV Aerospace & Defense Company, Dallas, Tex.

[21] Appl. No.: 127,547

[22] Filed: Dec. 2, 1987

Related U.S. Application Data

[63] Continuation of Ser. No. 825,121.

[51] Int. Cl.⁴ .................. F25B 19/00; H01L 25/04
[52] U.S. Cl. ................... 250/352; 62/514 JT; 250/338.1; 357/83
[58] Field of Search ............ 250/338 R, 352; 62/514 JT; 357/83

[56] References Cited

U.S. PATENT DOCUMENTS

| | | | |
|---|---|---|---|
| 3,079,504 | 2/1963 | Hutchens | 250/352 |
| 3,367,129 | 2/1968 | Freitag | 62/514 JT |
| 3,640,091 | 2/1972 | Buller et al. | 62/514 JT |
| 3,867,633 | 2/1975 | Patrick et al. | 250/338 X |
| 3,942,010 | 3/1976 | Peterson et al. | 250/352 |
| 3,962,578 | 6/1976 | Roschen | 250/352 X |
| 4,028,907 | 6/1977 | Herrington et al. | 62/514 JT X |
| 4,126,017 | 11/1978 | Bytniewski et al. | 62/514 JT |
| 4,262,200 | 4/1981 | Guy | 250/352 |
| 4,421,985 | 12/1983 | Billingsley et al. | 250/338 X |
| 4,474,036 | 10/1984 | Ball et al. | 250/352 X |
| 4,524,385 | 6/1985 | Billingsley et al. | 250/338 X |
| 4,647,778 | 3/1987 | Kline et al. | 62/514 JT X |
| 4,682,032 | 7/1987 | Barrett | 250/332 |

FOREIGN PATENT DOCUMENTS

0146121  8/1985  Japan .................. 250/352

Primary Examiner—Stephen C. Buczinski
Assistant Examiner—Linda J. Wallace
Attorney, Agent, or Firm—S. S. Sadacca; J. M. Cate

[57] ABSTRACT

An infrared receiver for detecting a communications signal during a fixed reception period in a high noise environment that includes a sensor having a cooled detector mounted upon a substrate upon the end of a cold well tube that further includes a cooling gas tube having a fixed orifice to emit a cooling gas upon the interior surface of the substrate. The receiver further includes a signal processor that receives the detector signals and determines if the detector signals include prdetermined signal characteristics of the communications signal.

14 Claims, 5 Drawing Sheets

ON BOARD RECEIVER

This Application is a continuation of application Ser. No. 825,121, filed 2/3/86, abandoned.

BACKGROUND

1. Field of the Invention

This invention relates to a communications receiver adapted to function in a high noise environment, and is more particularly related to an infrared receiver for receiving signals through a high intensity infrared noise environment.

2. Description of the Related Art

Infrared receivers have been used as communication receivers on moving vehicles such as rockets. In one typical application, an infrared receiver is mounted to a rocket to receive guidance signals from a transmitting station in order to provide guidance information to the rocket. However, if the receiver must receive the signals through the rocket exhaust or rocket plume, reception problems occur since the rocket plume presents a low transmissivity medium to the signal and further because the rocket plume provides an intense infrared background or noise environment. Background interference entails both a noise signal having a DC level component and a low frequency modulation component from the irregularities of the plume during rocket flight. Furthermore, the plume irregularities differ during the three stages of rocket flight: boost, sustained flight and coast.

For a sensitive receiver, an infrared detector sensor is provided that is often cooled by a cryostat. However, the cryostat usually requires a supply of cooling gas employed during flight and prior to launch. Therefore, in certain applications, the use of a cryostat can be restrictive.

It is therefore an object of the present invention to provide a receiver that receives communications signals in a high noise environment.

It is a further object of the present invention to provide an infrared receiver that receives communciation signals in the presence of a high intensity infrared noise environment such as a rocket exhaust plume.

SUMMARY OF THE INVENTION

In accordance with the present invention, a receiver for detecting a communications signal during a fixed reception period in a high noise environment is provided which includes a sensor for sensing the presence of the communications signal, the sensor including a detector mounted upon a substrate which in turn is mounted on an open end of a cold well tube having a cooling means for cooling the substrate. The receiver also includes a signal processing circuit that receives the detector signal and provides an output signal when the communications signal is received.

Also in accordance with the present invention, a receiver is provided for detecting a communications signal during a fixed reception period in a high noise environment, the receiver including a sensor for sensing the presence of the communications signal. The sensor has a detector apparatus connected to a cold well tube having a fixed orifice cooling gas tube that is connected to a cooling gas source, for providing cooling gas during a fixed time period. This fixed time period is less than the fixed reception period. The receiver further includes a signal processor for receiving a signal from the detector and providing an indication upon reception of the communications signal.

Still further, in accordance with the present invention, a receiver is provided for detecting an infrared communications signal having predetermined signal characteristics and which is transmitted during a fixed reception period in a high noise environment. The receiver includes an infrared sensor for sensing the presence of the communications signal, the sensor including a detector means providing an output signal upon detecting the communications signal. A signal processor is connected to the detector to determine if the detector output signal includes the signal characteristics of the communications signal.

In one embodiment of the invention, the receiver includes a spectral filter and a lens mounted adjacent to the detector to filter and to focus received signals upon the detector surface. Further, the lens is positioned to focus the received signals across the total detector surface.

In this embodiment, the signal processor includes a preamplifier circuit for providing a bias current to the detector. The signal processor further includes a postamplifier circuit that provides a gain signal adaptive to the high noise environment. Furthermore, the postamplifier includes a circuit to provide a nonlinear response to signals detected within a predetermined frequency bandwidth. In this embodiment, the predetermined signal characteristics used by the signal processor for determining the reception of the communications signal include the time duration characteristic of the signal.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
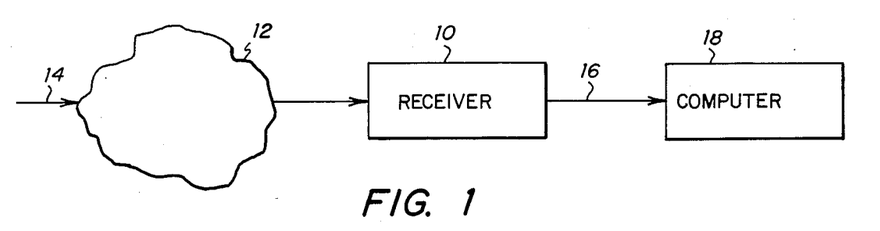
FIG. 1 is a block diagram illustrating a preferred embodiment of the invention as receiving a communications signal through a high noise environment and providing an output to a computer.

As previously discussed, this invention relates to an infrared receiver for use in a high noise environment. FIG. 1 is an illustration including a communications signal 14 that is being transmitted through a high noise environment 12 to a receiver 10. The function of the receiver 10 is to provide an output on line 16 to a computer 18 upon reception of the communications signal 14.

In the preferred embodiment, the receiver is mounted on the aft end of a rocket and during flight detects an infrared communications signal through the rocket exhaust plume. The rocket exhaust plume provides a low transmissivity medium to the communications signal attempting to penetrate the plume and, furthermore, provides a high intensity infrared background environment to the receiver, which includes both a high DC level component and a low frequency modulation component due to the swirls of the plume during rocket flight and further due to the irregular emissions of portions of the solid propellant from the rocket motor itself. This invention provides a sensitive receiver that is able to receive a communications signal through such a high intensity, infrared environment.

Figure 2:
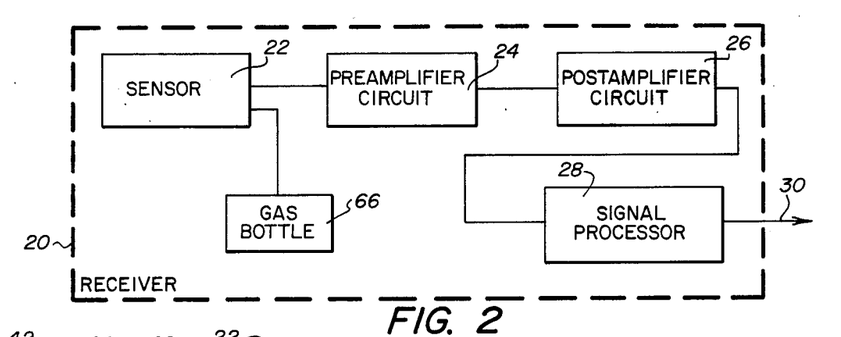
FIG. 2 is a block diagram of the receiver.

FIG. 2 is a functional block diagram of the preferred embodiment of the invention. The receiver 20 includes a sensor 22 to detect external signals, the sensor 22 also being connected to a cooling gas bottle 66. The sensor provides output signals corresponding to the external signals to a preamplifier 24 which, in turn, provides signals to the postamplifier 26. The output of the postamplifier 26 is input through a signal processor 28 which determines whether or not the communications signal has been received. Upon determining that a communications signal has been received, the signal processor provides an output on line 30 to a computer (not shown) within the rocket.

Figures 3, 4:
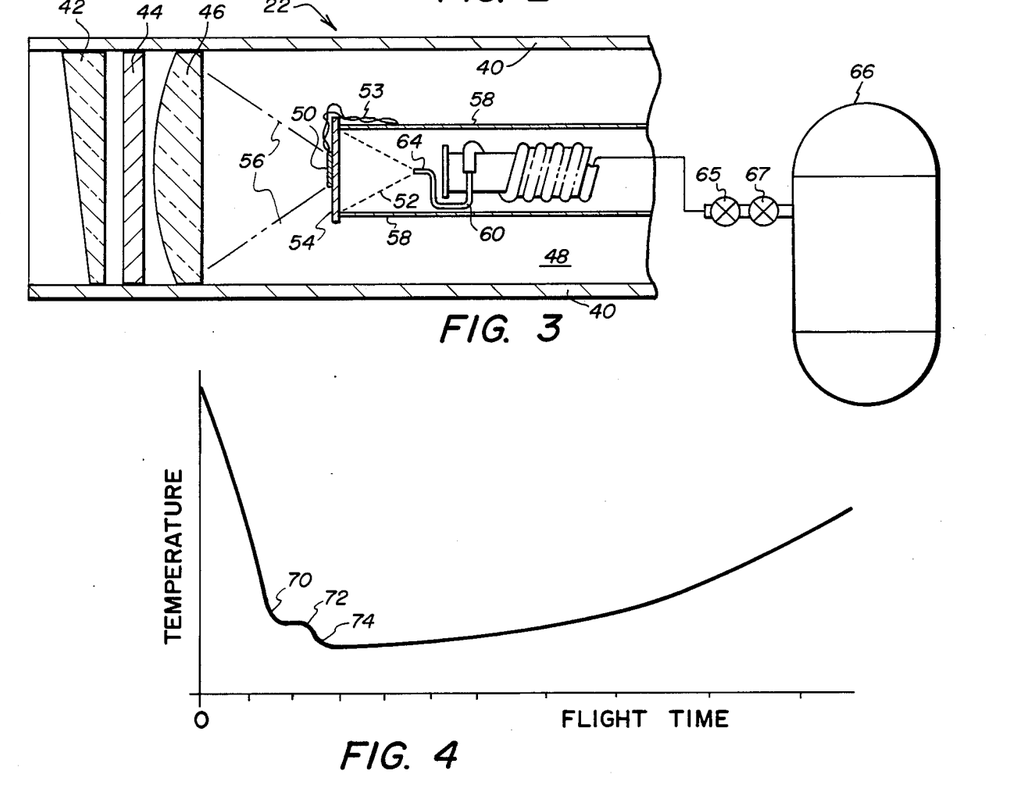
FIG. 3 is a sectional view of the sensor portion of the invention illustrating the cold well and optics.
FIG. 4 is a graph of the cold well detector surface temperature versus flight time.

Sensor 22 is illustrated in more detail in FIG. 3 in a partial sectional view. Referring to FIG. 3, the sensor 22 includes a housing 40 which is sealed on one end by a prism 42 mounted to vary the angle of received signals from the axis of the housing. Adjacent to the prism 42 is a spectral filter 44 provided to filter out a large portion of the DC noise of the high noise environment. A lens 46 is positioned to the right of the filter 44, as illustrated in FIG. 3, to focus filtered signals received from filter 44 onto the surface of an infrared detector 50. In this embodiment, the lens 46 is positioned to focus the received signals through a field of view 56 across the total sensing surface of the infrared detector 50. In other words, the detector is positioned slightly out of focus to spread the signal across the detector surface. In the illustrated embodiment, the infrared detector 50 is an integrated circuit including a photo conductive mercury cadmium telluride sensing surface. The detector 50 is connected by wire 53 to external electronics, to be discussed.

The detector 50 is mounted on a substrate 54, which in the preferred embodiment is a zinc selenide substrate thinly constructed and bonded to the open end of a cold well tube 58. As is illustrated in FIG. 3, this thin substrate 54 is mounted to enclose the end of the cold well tube 58. In the preferred embodiment, the substrate is approximately 10 millimeters thick and the cold well tube is formed of stainless steel of approximately 3 mills thickness. The cold well tube 58 includes a coiled gas tube 60 having a fixed orifice 64 positioned to emit gas in a pattern 52 towards the back of the substrate 54 to cool the detector 50. The coiled tube is connected by two squib actuated valves 65 and 67 to the gas bottle 66. Air pressure inside the sensor housing 40, indicated as volume 48, is maintained as a vacuum. Pressure inside the cold well tube 58, however, varies when gas is emitted through the gas tube 60.

In the preferred embodiment, as illustrated in FIG. 3, the receiver is only required to receive communications signals during a fixed reception period which begins shortly before launch and ends, normally, when the rocket motor fuel is expanded. In this embodiment, the pressure inside the cold well tube 58 reaches a maximum of 100 psi during this period. The gas tube 60 is connected to a cooling gas source 66 by two squib activated valves 65 and 67. Squib activated valve 67 is normally closed till activated and the other squib activated valve 65 is normally open till activated. In operation, the normally closed valve 67 is activated to open to provide a high pressure gas flow for approximately 1.2 seconds when the normally open valve 65 is activated to close.

While previous infrared receivers have used cryostats to cool and increase the sensitivity of their detectors, the present invention provides more efficient cooling of the detector 50 by providing the combination of a thin thermal mass 54 together with the cryostat gas tube 60. In this arrangement, the gas tube 60 includes a fixed orifice 64 that emits the cooling gas in a pattern 52.

Another benefit of this embodiment is that the cooling does not have to begin until shortly before the launch of the rocket. Therefore, no cooling occurs until the rocket launch is initiated, when the normally closed squib activated valve 67 is opennned. Therefore, this embodiment produces a quick cool down of the sensor detector 50. By mounting the detector 50 upon this thin thermal mass substrate 54 as discussed above it was found that the emission of cooling gas such as argon will cool down the detector 50 within approximately ½ second to operating temperature.

FIG. 4 is a graph of substrate 54 temperature versus flight time for the present invention. In the preferred embodiment it is preferable that additional cooling be provided to achieve temperatures below those which could be provided by emission of the cooling gas under constant pressure. This additional cooling provides increased signal sensitivity, and is provided in the present invention as follows. In the initial state, at time equals 0, cooling begins when the first valve 67 is activated. Initially, the substrate 54 is at approximately 300° Kelvin and begins cooling to point 70 on the graph. After this time, additional cooling gas does not provide any further cooling, as shown by the graph of FIG. 4 at point 72. At this point, the second valve 65 is activated. When the cooling gas is flowing, it flows under high pressure, e.g., 6000 psi in the preferred embodiment, which results in a pressure buildup within the cryostat. This pressure buildup and the presence of the gas result in formation of liquid droplets of what was the cooling gas as condensation within the tube on the surface of substrate 54. It should be appreciated that the size and shape of the cooling tube 60 in tube 58 provides a tortuous path for the cooling gas to escape, resulting in the pressure buildup. Then the gas in the cold well tube 58, which has now condensed into droplets, evaporates resulting in further cooling as illustrated at point 74. Since the pressure outside of the cold well tube is virtually a vacuum and the interior of the cold well tube is cooled by the evaporation of the cooling gas resulting from the timed activation of the second valve 65 to shut off gas flow, the cryostat characteristics of this apparatus provide the additional cooling required and provide cooling for several seconds after the supply of gas has been stopped. By varying the flow rate of gas and the time gas is emitted from the gas tube 60, the cooling may be varied in accordance with the requirements of each application.

The output of the sensor 22, including the detector 50 of FIG. 3, is provided on signal lines 53 (FIG. 3) to the preamplifier circuitry 24 as illustrated in FIG. 2. In practice, the preamplifier 24 provides a bias current to the photo conductive detector 50 for the detection of the received signals. These received signals provided to preamplifier circuitry 24 are then amplified and output to a postamplifier circuit 26. The postamplifier 26 provides an automatic gain control function, except that instead of adjusting the gain in accordance with the received signal, the postamplifier circuitry adjusts the gain in direct relation to the received noise and, additionally, provides a nonlinear response to signals received within the bandwidth of the communications signal. As previously discussed, the high infrared noise environment of the rocket plume produces a noise signal having a high amplitude DC level component and a low frequency modulation component. The high DC level component is partially removed by the filter in the sensor (filter 44 in FIG. 3). The remaining DC amplitude component and the low frequency modulation component are removed by the circuits 24, 26 and 28 as further described below.

Figure 5A:
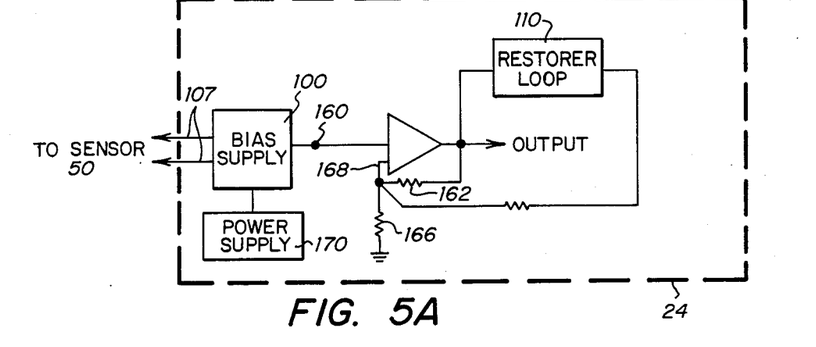
FIG. 5A is a functional block diagram of the preamplifier circuit.

FIG. 5A is a functional block diagram of the preamplifier circuit 24. The function of the preamplifier circuit 24 is to provide a bias current to the detector 50 and to remove the DC amplitude noise component. The bias current is provided by bias supply circuit 100 to the sensor on lines 107 which returns the sensed signal as an electrical output of detector 50. These electrical signals that correspond to the infrared signals received by the detector 50 are coupled to a preamplifier stage 102. The output 138 of the preamplifier stage 102 is also connected to a servo restorer loop 110 provided to remove the DC offset noise component. The preamplifier stage 102, in the preferred embodiment, regulates input power and includes sensor impedance matching capability. Since the sensor in this embodiment is a low impedance device, the preamplifier is configured for voltage amplification. The signal output on line 138 is provided to the postamplifier circuit 26.

Figure 5B:
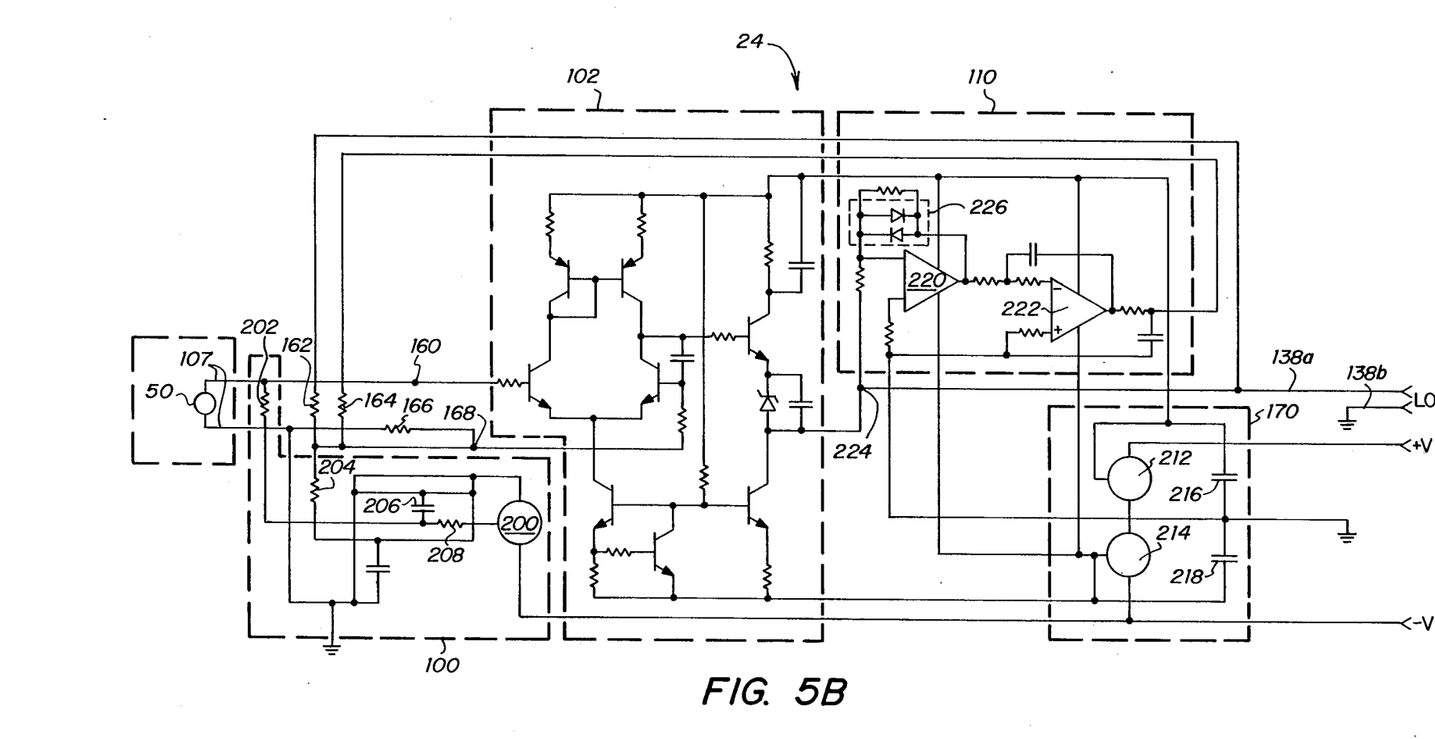
FIG. 5B is a schematic diagram of the preamplifier circuit.

The preamplifier circuit 24, shown as functional components in FIG. 5A, is illustrated in FIG. 5B in schematic form. Details of this schematic will now be discussed. Sensor 50 is connected across lines 107 to the voltage biased supply 100 which provides a negative bias current to sensor 50. Specifically, external voltages applied to a voltage regulator 200, a 79L12 in the preferred embodiment, which, together with the filter capacitor 206 and filter resistor 208 act to remove any voltage ripple from the power supply 170. Resistor 202 is further provided to current limit this voltage bias supply. The voltage bias supply 100 also assists the restorer loop circuitry 110 in maintaining a voltage balance across nodes 160 and 168. This balance is provided by resistor 204. Resistor 164 is a summing resistor connected to the restorer loop 110, and resistor 162 provides feedback resistance for the preamplifier 102. The circuitry for the differential amplifier 102 is illustrated in schematic form, and it should be apparent to one skilled in the art that this schematic diagram is that of a typical differential amplifier, and that any typical differential amplifier may be substituted for this amplifier 102. The output from the differential amplifier is provided on line 138a.

The power supply 170 is illustrated schematically as containing two voltage regulators 212 and 214 which, in the preferred embodiment, are 79L12 and 78L12 type voltage regulators connected across two filter capacitors 216 and 218 respectively to provide +12 and −12 supply voltage for this circuit. The restorer loop 110 includes a comparator 220 which tracks the voltage across node 224 and ground. In this preferred embodiment, comparator 220 is suitably an RCA model 741. A clamping diode network 226 is connected across comparator 220, as shown, and clamps the output of comparator 220 to 0.6.v and, specifically, provides a constant slew rate in the restorer loop circuit 110. The output of comparator 220 is coupled to a differential amplifier 222 which is configured as an integrator circuit. In the preferred embodiment, differential amplifier 222 is a low offset, low drift operational amplifier 5135 from Harris Semiconductor, Inc. The output of operational amplifier 222 drives node 168 back to equilibrium in response to variations on node 224, through comparator 220.

Figure 6A:
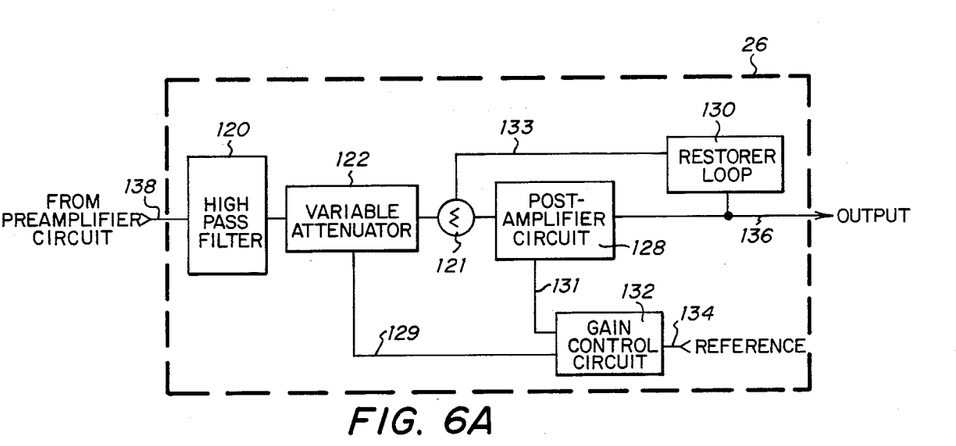
FIG. 6A is a functional block diagram of the post amplifier circuit.

FIG. 6A is a functional block diagram of the postamplifier 26. Postamplifier 26 includes a high pass filter 120, a variable attenuator 122, a postamplifier stage 128, a gain control circuit 132, and a second servo restorer loop 130. In the preferred embodiment, the postamplifier circuit 26 includes a compression amplifier (i.e. an amplifier having a nonlinear response) with gain control to provide amplification of weak signals while not allowing strong signals to overload or saturate the circuit. In other words, the output response of this amplifier 26 becomes nonlinear at a certain level. This nonlinear response is determined by the feedback and gain control circuit 132. The postamplifier circuit 26 uses the detected background noise signal amplitude as a reference signal for the gain control, allowing the signal to vary from a large magnitude to a small magnitude without affecting the sensitivity of the postamplifier circuit 26. With this nonlinear response, signal levels of magnitude that would normally be far in excess of the amplifiers capability are accommodated without circuit saturation while still providing adequate sensitivity to minimum discernable signal levels. The signals received from the preamplifier circuit 24 on line 138 still include the low frequency modulation noise component. This low frequency modulation component is removed by the high pass filter 120. The cut-off frequency for this filter is a compromise between the requirement for background noise attenuation and the resulting signal degradation.

The signal level which results in the nonlinear response from the postamplifier circuit 26 is adjusted by feedback to the variable attenuator circuit 122. The postamplifier circuit 128 actually consists of three gain stages having two attenuator devices as explained below. The two attenuator device outputs are each connected to the gain control circuit 132 as is the variable attenuator 122. In the preferred embodiment, these attenuator components are field effect transistors that with the ganged stages provide a gain controllable chain. The gain control voltage output from the gain control circuit 132 is provided on line 129 and is generated by integrating the error voltage difference between the background noise from the reference line 134 and a predetermined voltage level. This feedback is used to reduce the amplifier gain in proper sequence. Furthermore, each gain stage includes input clamping to prevent input saturation and each stage includes feedback diodes for compression at high amplitudes. The result is an increase in the dynamic range of this circuit. A servo restorer loop 130 is connected to the postamplifier 128 output on line 136 to provide a signal on line 133 to a summing node 121.

Figure 6B:
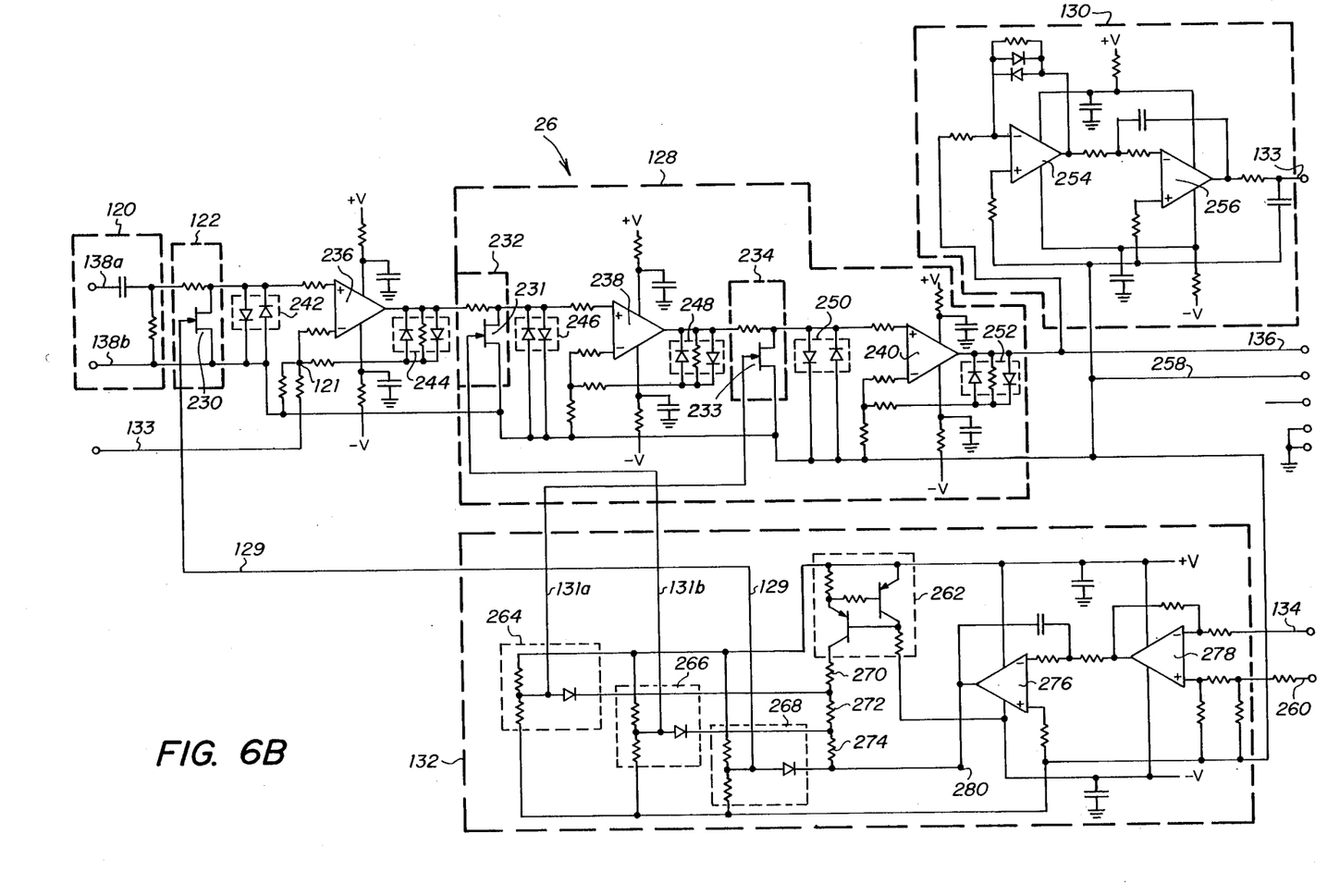
FIG. 6B is a schematic diagram of the post amplifier circuit.

The postamplifier 26 is illustrated in schematic form in FIG. 6B. The input from the preamplifier circuit 24 is provided on lines 138a and 138b to the high pass filter 120. As previously discussed, the high pass filter 120 acts to remove any remaining noise from the plume, i.e. any large DC noise component or low frequency AC components. Also as previously discussed, the postamplifier circuitry includes a gain control circuit 132 that varies the gain of the postamplifier circuit 26 in accordance with a noise reference signal on line 134, to be discussed. One of the outputs of the gain control circuit 132 is provided on line 129 to the variable attenuator stage 122. Attenuator stage 122 consists of a field effect transistor 230, which in the preferred embodiment is a 2N4859 type, that acts as a voltage control resistance to provide attenuation. The output of the variable attenuator stage 122 is shunted by diode pair 242 acting as a diode clamp to prevent saturation of the next stage. The summing node 121 from the restorer loop 130 is illustrated as node 121 input to a fixed gain operational amplifier 236 which in the preferred embodiment is a Harris semicondutor HA5190 type. A diode pair network 244 is shunted across the output of operational amplifier 236 to provide a nonlinear response for the amplifier 236 when the output voltage reaches a predetermined point. The output of the diode network 244 is provided as an input to the postamplifier circuit 128. Circuit 128 consists of two variable attenuation stages 232 and 234 with fixed gain operational amplifiers 238 and 240. Variable attenuation stage 232 also includes a field effect transistor 231 configured in a similar manner to field effect transistor 230. In this preferred embodiment, field effect transistors 230, 231, and 233 are all voltage control resistor field effect transistors type 2N4859, as previously described. The outputs of the variable attenuators stages 232 and 234 are shunted across clamping diode networks 246 and 250 respectively to prevent saturation of the next gain stages. The operational amplifiers 238 and 240 are also similar to the operational amplifier 236 and include shunted diode pair networks 248 and 252, respectively similar to diode network 244, to provide nonlinear response as previously discussed. The output of the postamplifier circuit 138 is provided on line 136 which is connected as an input to the restorer loop 130. The restorer loop 130 is configured in a manner similar to the restorer loop 110 of the preamplifier circuit 24. However, in the postamplifier 26, the restorer loop will not be as susceptible to noise as the restorer loop 110 since the postamplifier circuit is buffered from external noise by the preceding preamplifier circuit 24. Therefore, the operational amplifiers configured as the comparator circuit 254 and the integrator circuit 256 are each a 741 in the preferred embodiment. The output of the restorer circuit is provided to line 133 which is connected to the summing node 121 as shown. The gain control circuit 132 is illustrated as including three resistor diode networks 264, 266, and 268 that provide clamping voltage protection to the variable attenuator stages 122, 232 and 234 respectively. A current source 262 is connected to supply current to resistors 270, 272 and 274. Resistors 270, 272 and 274 provide a two volt signal spread between the voltage signals to the three variable attenuator stages 122, 232 and 234 on lines 129, 131a and 131b. This two volt signal spread insures the independent attenuation of each of the variable attenuators 122, 232 and 234. The attenuation signal is provided on node 280 from the operational amplifier 276 configured as an integrator circuit. Operational amplifier 276 receives its input from an operational amplifier 278 configured as a comparator circuit. Operational amplifier 278 includes an input from an external voltage supply on line 260 and a noise reference signal on line 134 from the signal processing circuit 28. The gain control circuit 132 is configured to provide an increase of voltage on node 280 when the noise exceeds the reference. This results in the increase of gate voltage of the field effect transistors 230, 231 and 233 of the variable attenuator stages 122, 232 and 234 respectively thus causing a decrease in the field effect transistor resistance, resulting in greater attenuation for that stage. Therefore, by referencing the noise signal on line 134, the gain control circuitry 132 allows noise to vary the attenuation in the postamplifier circuitry 26 to provide a constant noise background for the signal output on line 136.

Figure 7A:
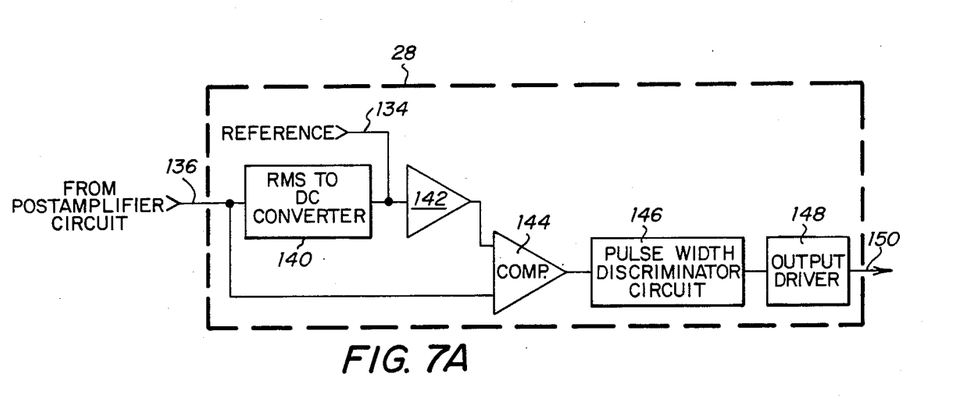
FIG. 7A is a functional block diagram of the signal processor.

The output on line 136 of the postamplifier circuit 26 is coupled to the signal processor circuit 28 which is illustrated in functional block form in FIG. 7A. Signal processor 28 provides the noise reference signal on line 134 from an RMS to DC converter circuit 140. The output of the RMS to DC converter circuit 140 is input through a gain stage 142 to a comparator 144 that compares this signal, the gain stage 142 output, to the nonconverted signal on line 136. This output is then provided to a pulse width discriminator circuit 146 to determine whether or not the received signal, a pulse in the preferred embodiment, includes a predetermined pulse width. The pulse width discriminator circuit 146 reduces the number of false alarm indications from the receiver by ignoring those received signals that do not have the predetermined signal characteristic, i.e. predetermined pulse width. The pulse width circuit 146 is connected to an output driver 148 to provide the receiver output on line 150.

Figure 7B:
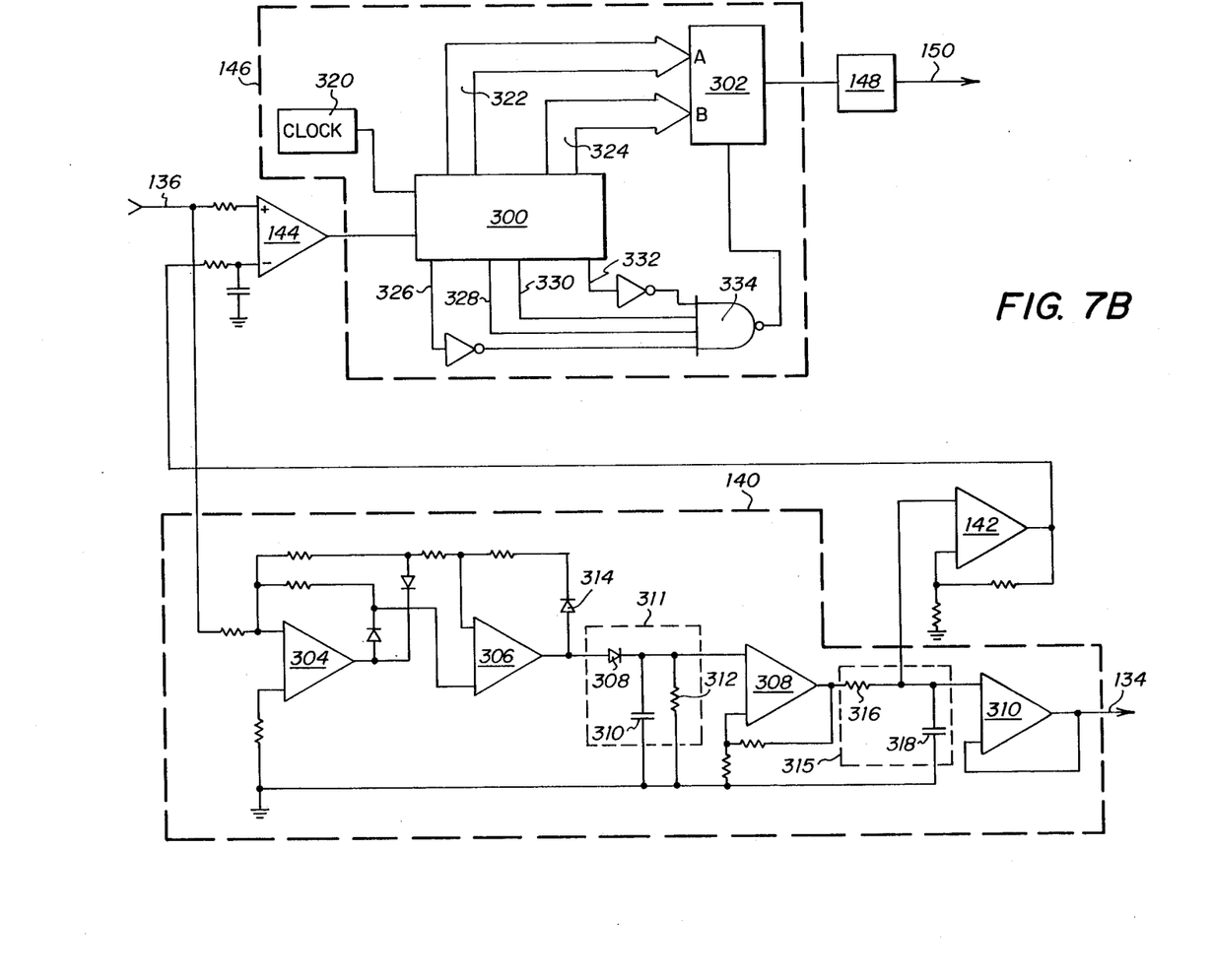
FIG. 7B is a schematic diagram of the signal processor.

The signal processing circuit 28 illustrated in schematic form in FIG. 7B, will now be discussed. The RMS to DC signal converter 140 includes an input from the postamplifier circuit 26 on line 136 that is provided to two operational amplifiers 304 and 306. Operational amplifiers 304 and 306 serve as a full wave rectifier of the background noise signal providing an input to a circuit network 311, consisting of diode 308, capacitor 310 and resistor 312, to perform a peak and hold function on the rectified noise signal. In this circuit network 311, the hold time is determined by resistor 312. Diode 314 is provided in a feedback loop to compensate for the voltage drop across diode 308. The output of the peak and hold network 311, i.e. the voltage across resistor 312, is provided to an operational amplifier 308 that isolates and provides gain for driving a smoothing filter 315 consisting of resistor 316 and capacitor 318. The output of the smoothing filter 315 is input to operational amplifier 310. Operational amplifier 310 provides isolation for driving the noise reference signal on line 134 used by the gain control circuit 132 of the postamplifier circuit 26, as previously discussed. The output of this smoothing filter 315 is also provided as an input to operational amplifier 142. Operational amplifier 142 provides gain for the detection level signal provided to comparator 144. Comparator 144 compares the input on line 136 from postamplifier circuit 26 to this detection level from operational amplifier 142. The output of comparator 144 is provided to the pulse width discriminator circuit 146 that consists of an N bit shift register 300, where N is selected such that $(N-2)/F_c$ is greater than the maximum pulse width, $F_c$ being the clock frequency of clock 320. The function of the shift register 300 is to store and center the receive pulse. The shift register 300 is a serial-in/parallel-out shift register which, in the preferred embodiment, is a type 74LS673. The output of shift register 300 includes Bus 322 and Bus 324. Bus 322 includes bit positions 3 through N/2, and Bus 324 consists of bit positions $(N/2)+1$ through $N-2$. Bit positions 2 and $N-1$ are not used, thus eliminating the need for clock synchronization. The output of buses 322 and 324 are provided to a comparator 302. In the preferred embodiment, the comparator is a type 54ALS 518; however, those skilled in the art would appreciate that this comparator 302 function can be accomplished by an arithmetic logic unit or a network of exclusive OR gates. When the pulse has been received, centering of the pulse is determined by the outputs of lines 326, 328, 330 and 332. Specifically, line 326 represents bit position 1, line 328 represents bit position N/2, line 330 represents bit position $N/2+1$ and line 332 represents bit position N. Therefore, if the pulse is centered, lines 326 and 332 should be low and lines 328 and 330 should be high, resulting in an output of NAND gate 334 enabling the comparator 302. If the pulse is wide enough, the signals on Bus 332 will be equivalent to the signals on Bus 324, resulting in the output of comparator 302 being high. The output of comparator 302 is connected to the driver 148 which, in the preferred embodiment, is a one shot whose output pulse is of a convenient width for interfacing to the missile flight control computer on line 150.

It should be understood by those skilled in the art that this invention provides a sensitive receiving capability with high noise discrimination. The sensitive receiving capability results from mounting the signal detector upon a thin substrate mass which is quickly cooled from cooling gas emitted on an opposite substrate side and cooled even further by the evaporation of cooling gas condensate. The high noise discrimination is provided by the spectral filter in combination with preamplifier and postamplifier circuits that electronically remove the electrical noise properties from the signal being processed and, still further, in combination with a signal processor circuit that uses predetermined communication signal characteristics to distinguish the received communications signal.

It should be appreciated that this invention has other applications and would provide effective communication in applications where a high intensity infrared noise signal exists. One such application, for example, would entail using pulsed communications in a furnace environment to control material formation machinery. Another in a system providing pulsed communications between spacecraft in the presence of solar noise.

Although the invention has been described with reference to a specific embodiment, this description is not to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiment that fall within the true scope of the invention.

What is claimed is:

1. A receiver for detecting a communications signal during a fixed reception time period comprising:
   means for detecting the presence of the communications signal and for generating a detector signal;
   signal processing means for receiving said detector signal and for providing an indication of reception of the communication signal;
   a cold well tube;
   a source of cooling fluid;
   a fixed orifice cooling gas tube disposed within said cold well tube and connected to said source of cooling fluid;
   said detecting means being connected to said cold well tube; and
   valve means connected between said source of cooling fluid and said cooling gas tube for providing cooling fluid under pressure to said cold well tube and said detecting means for a fixed time period which is less than the fixed reception time period.

2. The receiver of claim 1 wherein said detecting means includes:
   a detector having a surface;
   a spectral filter and a lens mounted adjacent to said detector for filtering and focusing received signals onto said detector surface.

3. The receiver of claim 2 wherein said lens is positioned to focus received signals across the entire detector surface.

4. The receiver of claim 1 wherein said valve means provides cooling fluid to said cold well tube at the beginning of the reception period and ending before the end of the reception period.

5. The receiver of claim 1 wherein said signal processing means includes a preamplifier circuit for providing a biasing current to said detecting means.

6. The receiver of claim 5 wherein said signal processing means includes a post amplifier for providing a gain signal.

7. The receiver of claim 6 wherein said post amplifier includes circuit means for providing a nonlinear response to signals detected within a predetermined frequency bandwidth.

8. An infrared receiver for detecting a communications signal transmitted during a fixed reception time period comprising:
   a housing;
   a cold well tube disposed within said housing;
   a source of cooling fluid;
   a fixed orific cooling gas tube disposed within said cold well tube and connected to said source of cooling fluid;
   a substrate having first and second sides and being mounted to said cold well tube, such that said first side lies adjacent to said gas tube;
   a detector mounted to said second side of said substrate for detecting the presence of the communications signal within said housing and for generating a detector signal;
   valve means connected between said source of cooling fluid and said cooling gas tube for providing cooling fluid under pressure to said first side of said substrate for a fixed time period which is less than the fixed reception time period; and signal processing means for receiving said detector signal and for providing an indication of reception of the communication signal.

9. The receiver of claim 8 and further including:
a prism mounted to said housing for directing received communications signals into said housing;
a spectral filter disposed within said housing and adjacent said prism; and
a lens disposed within said housing between said spectral filter and said detector.

10. The receiver of claim 8 wherein said lens is disposed within said housing to focus received signals across the entire detector.

11. The receiver of claim 8 wherein said valve means provides cooling fluid to said cold well tube at the beginning of the reception period and ending before the end of the reception period.

12. The receiver of claim 8 wherein said signal processing means includes a preamplifier circuit for providing a biasing current to said detecting means.

13. The receiver of claim 12 wherein said signal processing means includes a post amplifier for providing a gain signal.

14. The receiver of claim 13 wherein said post amplifier includes circuit means for providing a nonlinear response to signals detected within a predetermined frequency bandwidth.

* * * * *